United States Patent
Teh et al.

(10) Patent No.: US 12,393,255 B2
(45) Date of Patent: Aug. 19, 2025

(54) SYSTEM AND A METHOD FOR NETWORK-ON-CHIP POWER MANAGEMENT

(71) Applicant: SKYECHIP SDN BHD, Penang (MY)

(72) Inventors: Chee Hak Teh, Bayan Lepas (MY); Yu Ying Ong, Bayan Lepas (MY); Soon Chieh Lim, Bayan Lepas (MY); Muhamad Aidil Bin Jazmi, Bayan Lepas (MY); Yeong Tat Liew, Bayan Lepas (MY); Weng Li Leow, Bayan Lepas (MY)

(73) Assignee: SKYECHIP SDN BHD (MY)

( * ) Notice: Subject to any disclaimer, the term of this patent is extended or adjusted under 35 U.S.C. 154(b) by 88 days.

(21) Appl. No.: 18/399,978

(22) Filed: Dec. 29, 2023

(65) Prior Publication Data
US 2025/0138623 A1    May 1, 2025

(30) Foreign Application Priority Data
Oct. 25, 2023    (MY) .............................. PI2023006579

(51) Int. Cl.
   *G06F 1/00*      (2006.01)
   *G06F 1/3287*    (2019.01)
(52) U.S. Cl.
   CPC .................................. *G06F 1/3287* (2013.01)
(58) Field of Classification Search
   CPC .................................................... G06F 1/3287
   See application file for complete search history.

(56) References Cited

U.S. PATENT DOCUMENTS

| | | | | |
|---|---|---|---|---|
| 9,477,280 B1* | 10/2016 | Gangwar | .............. | G06F 1/3296 |
| 9,568,970 B1* | 2/2017 | Kaushal | .............. | G06F 15/7825 |
| 9,829,962 B2 | 11/2017 | Kaushal et al. | | |
| 2008/0057896 A1* | 3/2008 | Kim | ...................... | G06F 1/3203 |
| | | | | 455/187.1 |
| 2014/0143558 A1* | 5/2014 | Kuesel | ...................... | G06F 1/26 |
| | | | | 713/300 |
| 2016/0363985 A1* | 12/2016 | Ehmann | ................ | G06F 9/4403 |
| 2017/0228481 A1* | 8/2017 | Pusuluri | ................ | G06F 30/392 |
| 2018/0109415 A1* | 4/2018 | Han | ................ | H03K 19/00384 |
| 2021/0344618 A1* | 11/2021 | Zheng | ................ | H04L 41/0816 |

\* cited by examiner

*Primary Examiner* — Xuxing Chen
(74) *Attorney, Agent, or Firm* — Jayne Saydah

(57) ABSTRACT

The present invention relates to a system for network-on-chip power management. The system comprising a primary network-on-chip comprises multiple components, each component having a power controller, characterized by a secondary network-on-chip comprises a secondary network-on-chip master node and a plurality of secondary network-on-chip nodes connected thereto, the plurality of secondary network-on-chip nodes associated to the components of the primary network-on-chip for power managing individual and link components of the primary network-on-chip, and a power management unit connected to the secondary network-on-chip master node, configured to polling status registers of the components of the primary network-on-chip for accessing power states of each component, accessing routing information of the components of the primary network-on-chip and sending request to the secondary network-on-chip nodes for powering on or off the associated components of the primary network-chip through the power controller. A method for network-on-chip power management is also disclosed herein.

11 Claims, 13 Drawing Sheets

SYSTEM AND A METHOD FOR NETWORK-ON-CHIP POWER MANAGEMENT

TECHNICAL FIELD

The present invention relates generally to network-on-chip (NoC) power management. More particularly, the present invention relates to a system and a method for optimizing the power consumption of the NoC.

BACKGROUND ART

NoC is a complex micro-architecture comprised of hardware components such as routers, node interfaces, slices, et cetera. The presence of these components consumes high power. Therefore, managing the power of each component is essential to optimize the power consumption of the NoC.

Numerous efforts have been made to manage the power of NoC. One of the efforts is discussed in the following references.

U.S. Pat. No. 9,829,962B2 discloses a method and system for execution of power profile management instructions for a NoC and/or a System on Chip (SoC) using a hybrid combination of software and hardware, wherein the hardware element of the NoC/SoC can be run in parallel with other hardware elements of the NoC/SoC to generate and execute power profile management instructions for different segments or regions of the SoC/NOC for efficient and safe working thereof. The system allows a user to trigger an abortion of an ongoing power state switching sequence. Nevertheless, the system's power management blocks can only manage the power of other blocks and cannot autonomously manage its own power.

Accordingly, there remains a need to provide a system and method which involves the use of a dual-parallel NoC topology where a lightweight secondary NoC acts as a co-pilot to manage the power consumption of each component of a primary NoC. At the same time, the secondary NoC is also able to power manage itself without needing a tertiary NoC. Furthermore, there is also a need to provide a system that can independently abort any power state entry based on internally triggered state when there is incoming traffic that could potentially interrupt the in-flight flits. The present invention provides such a system and a method for NoC power management that can manage the NoC power with great finesse without sacrificing performance.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to provide a system which uses a lightweight secondary NoC to manage the power consumption of a primary NoC.

It is also an objective of the present invention to provide a system which is capable of managing the power consumption of each component of the primary NoC.

It is further an objective of the present invention to provide a system comprises a lightweight secondary NoC which is capable of power-managing itself while power-managing the primary NoC.

It is yet another objective of the present invention to provide a method for NoC power management.

Accordingly, these objectives may be achieved by following the teachings of the present invention. The present invention relates to a system for NoC power management. The system comprising a primary NoC comprises multiple components, each component having a power controller, characterized by a secondary NoC comprises a secondary NoC master node and a plurality of secondary NoC nodes connected thereto, the plurality of secondary NoC nodes associated to the components of the primary NoC for power managing individual and link components of the primary NoC, and a power management unit connected to the secondary NoC master node, configured to polling status registers of the components of the primary NoC for accessing power states of each component, accessing routing information of the components of the primary NoC and sending request to the secondary NoC nodes for powering on or off the associated components of the primary NoC through the power controller.

The present invention also relates to a computer-implemented method for NoC power management. The method comprising the steps of receiving powering-off request from a power controller within a component of a primary NoC by a secondary NoC, executing an interrupt service check to check the interrupt source's status registers to identify the interrupted component and effect of interrupting to link components, accessing routing information of the primary NoC for traffic condition to identify the components of the primary NoC to be powered off, and powering off the components of the primary NoC by the secondary NoC based on the interrupted component, effect of interrupting to link components and routing information, wherein the steps of executing the interrupt service check and accessing routing information of the primary NoC are conducted by a power management unit connected to the secondary NoC.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

So that the manner in which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figures, with like reference numbers referring to like structures across the views, wherein.

DETAILED DESCRIPTION OF THE INVENTION

Figure 1:
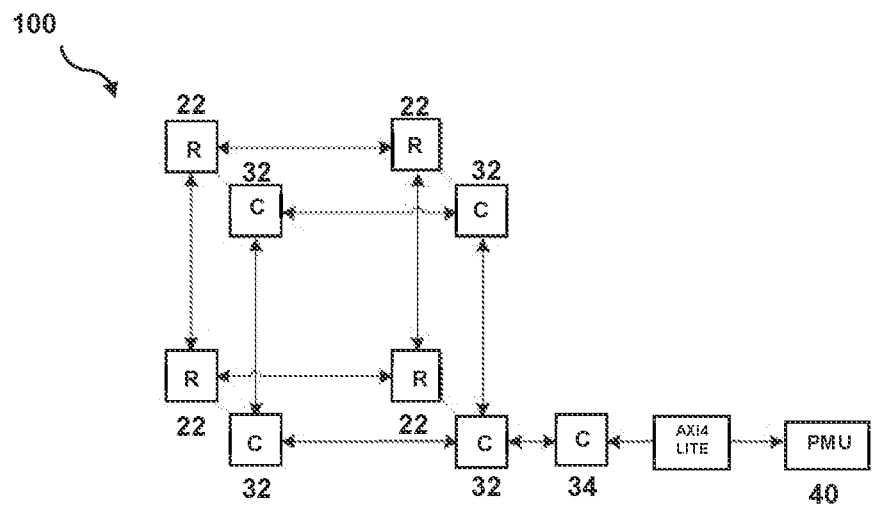
FIG. 1 is a diagram illustrating a 1:1 relationship between numbers of the secondary NoC nodes to the components of the primary NoC in accordance with an embodiment of the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting but merely as a basis for claims. It should be understood that the drawings and detailed description thereto are not intended to limit the invention to the particular form disclosed, but on the contrary, the invention is to cover all modifications, equivalents and alternatives falling within the scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to. Further, the words "a" or "an" mean "at least one" and the word "plurality" means one or more, unless otherwise mentioned. Where the abbreviations or technical terms are used, these indicate the commonly accepted meanings as known in the technical field.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the invention.

The present invention relates to a system (10) for NoC power management. The system (10) comprising a primary NoC (20) comprises multiple components (22), each component (22) having a power controller, characterized by a secondary NoC (30) comprises a secondary NoC master node (34) and a plurality of secondary NoC nodes (32) connected thereto, the plurality of secondary NoC nodes (32) associated to the components (22) of the primary NoC (20) for power managing individual and link components (22) of the primary NoC (20), and a power management unit (40) connected to the secondary NoC master node (34), configured to polling status registers of the components (22) of the primary NoC (20) for accessing power states of each component (22), accessing routing information of the components (22) of the primary NoC (20) and sending request to the secondary NoC nodes (32) for powering on or off the associated components (22) of the primary NoC (20) through the power controller.

The present invention also relates to a computer-implemented method for NoC power management. The method comprising the steps of receiving powering-off request from the power controller within the component (22) of the primary NoC (20) by the secondary NoC (30), executing an interrupt service check to check the interrupt source's status registers to identify the interrupted component (22) and effect of interrupting to link components (22), accessing routing information of the primary NoC (20) for traffic condition to identify the components (22) of the primary NoC (20) to be powered off, and powering off the components (22) of the primary NoC (20) by the secondary NoC (30) based on the interrupted component (22), effect of interrupting to link components (22) and routing information, wherein the steps of executing the interrupt service check and accessing routing information of the primary NoC (20) are conducted by the power management unit (40) connected to the secondary NoC (30).

Referring to the drawings, the invention will now be described in more details.

FIG. 1 is a diagram illustrating the system (10) in accordance with an embodiment of the present invention. It shows a 1:1 ratio of the secondary NoC nodes (32) to the components (22) of the primary NoC (20), in particularly, one secondary NoC node (32) is associated to one component (22) of the primary NoC (20). It does not preclude implementations from using a different N:1 ratio where N is a positive integer. It is possible for one secondary NoC node (32) to manage the power for N number of the components (22) of the primary NoC (20) that is associated to this one secondary NoC node (32).

In accordance with an embodiment of the present invention, the primary NoC (20) is responsible for routing regular packets between traffic sources and destinations within the system (10). The primary NoC (20) typically has a very high bandwidth capacity in the GBps range.

In accordance with an embodiment of the present invention, the secondary NoC (30) is a lightweight NoC that co-exists in parallel with the primary NoC (20), but it does not necessarily share the same topology. The secondary NoC (30) has a relatively lower bandwidth in the hundreds of Mbps range compared to the primary NoC (20), but its bandwidth is scalable to meet the bandwidth requirements imposed by the power management unit (40) to handle the power management of a spectrum of differently sized primary NoC (20). Notably, the secondary NoC (30) is typically on an always-on domain. However, the secondary NoC (30) can be power gated as well under a self-manage mode. In other words, the secondary NoC (30) has the capability to self-manage its own power under the control of the power management unit (40). The always-on properties allow the secondary NoC (30) to interoperate with the power management unit (40) to act as a co-pilot to monitor the power states of the primary NoC (20) and rapidly respond to changing conditions that affect which components (22) of the primary NoC (20) need to be switched on and which ones can be opportunistically switched off through the power controller of the components (22).

Figure 2:
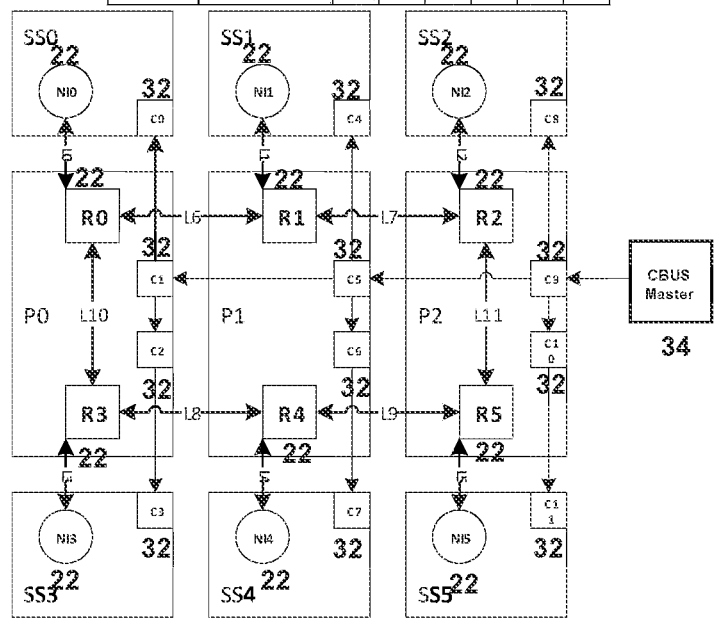
FIG. 2 is an example illustrating a routing table and the secondary NoC nodes super-imposed on top of the primary NoC and the secondary NoC nodes are connected to the secondary NoC master node.

In accordance with an embodiment of the present invention, the primary NoC is a static routing. To achieve static routing, a routing map, a routing table or a routing activity table will be set up by a NoC software. The routing table comprising routing information which describes the components (22) through which the packets need to travel from each source node interface to each destination node interface. FIG. 2 is a diagram illustrating an example of the routing table and the secondary NoC nodes (32) superimposed on the components (22) of the primary NoC (20) and the secondary NoC nodes (32) are connected to the secondary NoC master node (34). The integer "1" in the routing table indicates that the packets from the specified primary source ID node interface (NI) will pass through the component (22) such as router on its way to the specified destination ID node interface (NI) within the primary NoC (20).

In accordance with an embodiment of the present invention, the NoC power management is handled by a firmware runs on a processing resource and a memory resource. The processing resource including but is not limited to the power management unit (40), a central processing unit or a microcontroller. The memory resource includes a static random-access memory or a dynamic random-access memory which have sufficient speed and storage capacity to monitor and control the NoC's power. In the present invention, the key to manage power consumption is having a timely awareness of which component (22) of the primary NoC (20) and when that particular component (22) needs to be powered off and powered on. Therefore, the firmware runs on the power management unit (40) must be aware of active and pending traffic status of each source and destination node interface, and the packets travelling flow within the primary NoC (20).

Figure 3:
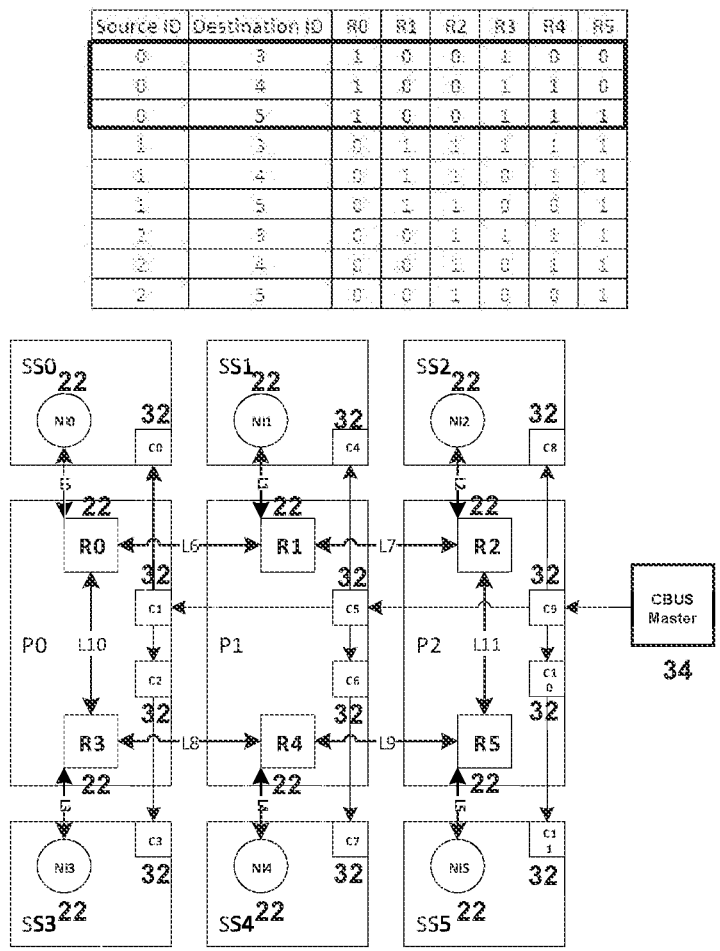
FIG. 3 is an example illustrating an inactive region in a routing table and the secondary NoC nodes super-imposed on top of the primary NoC and the secondary NoC nodes are connected to the secondary NoC master node.
Figure 4:
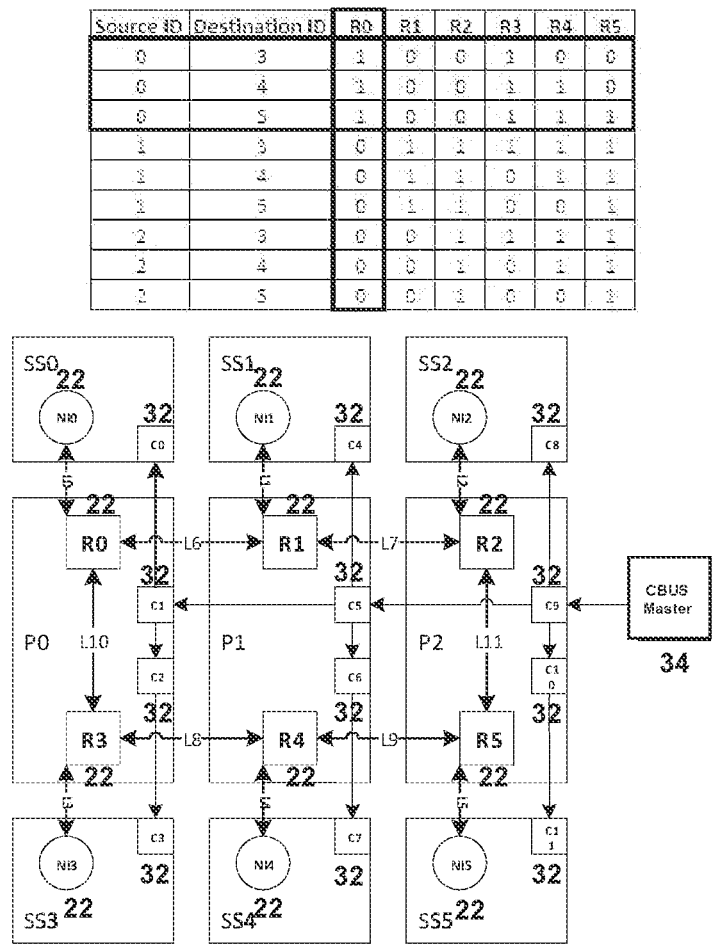
FIG. 4 is an example illustrating an inactive region in a routing table indicating a candidate for powering off and the secondary NoC nodes super-imposed on top of the primary NoC and the secondary NoC nodes are connected to the secondary NoC master node.

FIG. 3 is a diagram illustrating an example of the inactive region in the routing table and the secondary NoC nodes (32) super-imposed on the components (22) of the primary NoC (20) and the secondary NoC nodes (32) are connected to the secondary NoC master node (34). When there is no active and no pending traffic from or to Node Interface NI0, an inactive region will be carved out in the corresponding routing table by marking the relevant rows as inactive. Moreover, any components (22) of the primary NoC (20) represented by a column that does not have any active traffic and any pending traffic, that particular component (22) will be considered as a candidate to be powered off. This is shown in FIG. 4 where router R0 has potential to be powered off. For each component (22) that is identified as the power-off candidate, the power management unit (40) will execute the power-off entry sequence.

In accordance with an embodiment of the present invention, the components (22) of the primary NoC (20) comprise routers, node interfaces, slices, and coherent hubs. More particularly, the node interfaces are master nodes and slave nodes, the slices are either non-flow-control slices or flow-control slices and the coherent hubs are home nodes. Each component (22) comprises a power controller, which is always-on and clocked. This enables the power controller to constantly monitor and react to power-off and power-on events of the component (22). The power controller works in tandem with a pair of link controller comprised of a transmitter (TX) link controller and a receiver (RX) link controller which are also always-on to monitor link power states. When conditions are ripe for powering off, the power controller of the components (22) will send an interrupt message to the power management unit (40) via the secondary NoC (30) to indicate a component (22) as a candidate for powering off. Alternatively, the power management unit (40) will take the responsibility to actively poll the status registers of the components (22) of the primary NoC (20) to discover its power status.

Figure 5:
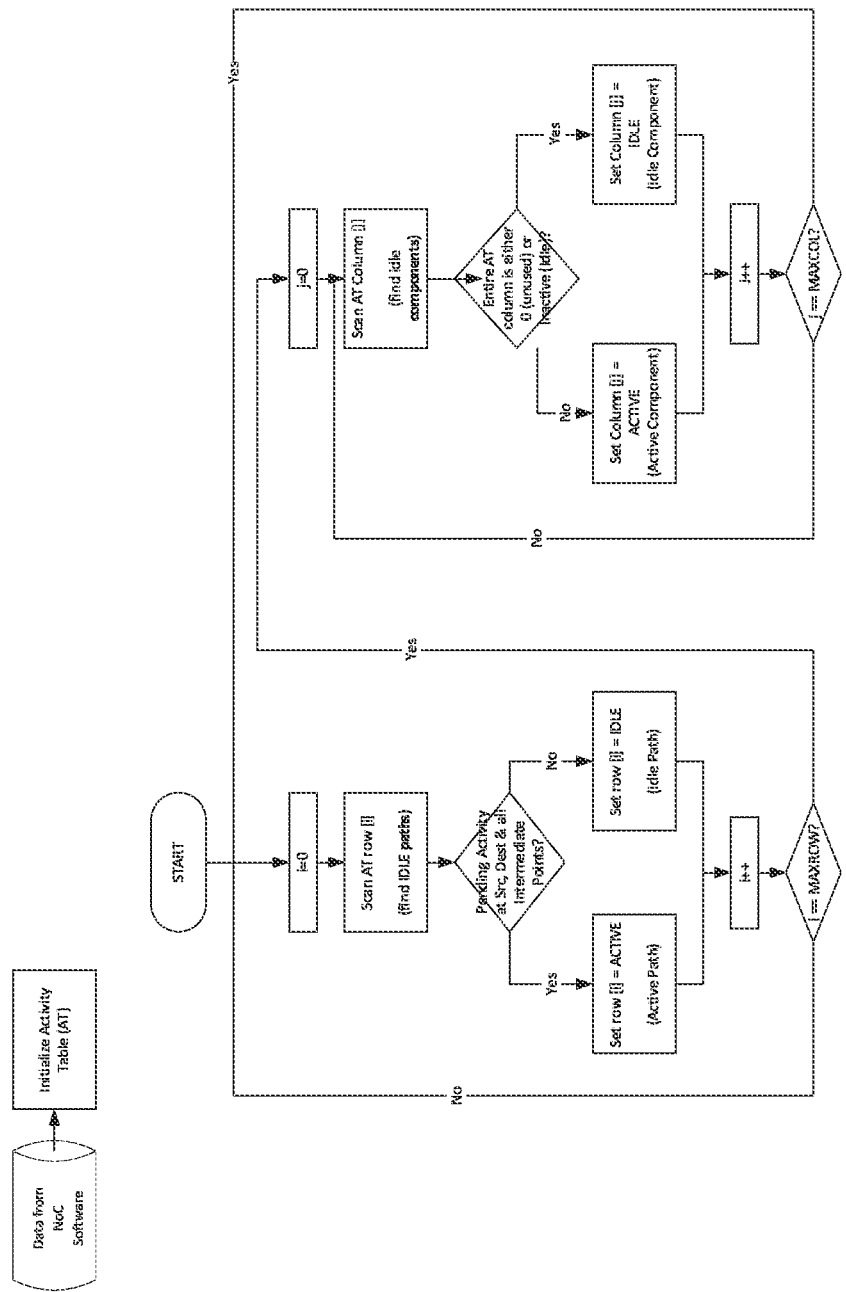
FIG. 5 is a flow diagram illustrating a process of interrupt service routine to identify the component to be powered off in accordance with an embodiment of the present invention.

In accordance with an embodiment of the present invention, the power management unit (40) will react to the interrupt message or poll low power component (22) of the primary NoC (20) by executing an interrupt service routine to check the interrupt source's status registers. The power management unit (40) will identify both the interrupted component (22) of the primary NoC (20) as well as the effect of the interrupted component (22) on the active and inactive regions of the routing table. This process is depicted in FIG. 5 and it is designed to identify the component (22) of the primary NoC (20) to be powered off. Since the power management unit (40) maintains the routing activity table of the primary NoC (20) and it also keeps track of which source-destination pairs have pending transactions; hence, it has sufficient information to decide which component (22) of the primary NoC (20) can be powered off. If the component (22) can be powered off, the power management unit (40) will program the associated secondary NoC node (32) to power off the component (22) of the primary NoC (20) that associates to the secondary NoC node (32). When a wake-up event is detected, the affected component (22) of the primary NoC (20) will send an interrupt message to the power management unit (40) via the secondary NoC (30). The power management unit (40) will then begin the flow to power on that affected component (22) of the primary NoC (20). In addition, the power management unit (40) will also power on any components (22) of the primary NoC (20) that are along the path that the source packets will take to reach its destination, through the secondary NoC nodes (32) that associate to the components (22). If the destination or slave is currently powered off, the power management unit (40) will also wake it up through the secondary NoC node (32) that associates to the destination or slave. The routing table will get updated accordingly by the power management unit (40) to mark the freshly powered-on components (22) as active.

In accordance with an embodiment of the present invention, the secondary NoC (30) is capable of self-managing its own power without needing assistance from a lighter-weight tertiary NoC. This is because the secondary NoC nodes (32)

correspond to the components (22) of the primary NoC (20) for simultaneous powering on and off. In other words, the powering-on and -off of any components (22) of the primary NoC (20) will trigger its corresponding secondary NoC node (32) to power on and off.

In accordance with an embodiment of the present invention, the power management unit (40) allows the component (22) of the primary NoC (20) to abort power-off request if the component (22) that is trying to be powered off suddenly receives traffic before it has acknowledged the power-off request from the power management unit (40). The abort option is useful because the point of observation-decision-request at the power management unit (40) may lag behind events occurring asynchronously in real time within and around the NoC that may reverse the power-off decision. Additionally, the abort option is also helpful to avoid performance loss due to erroneous power-off.

Hereinafter, examples of the present invention will be provided for more detailed explanation. The advantages of the present invention may be more readily understood and put into practical effect from these examples. However, it is to be understood that the following examples are not intended to limit the scope of the present invention in any ways.

EXAMPLES

Figure 6:
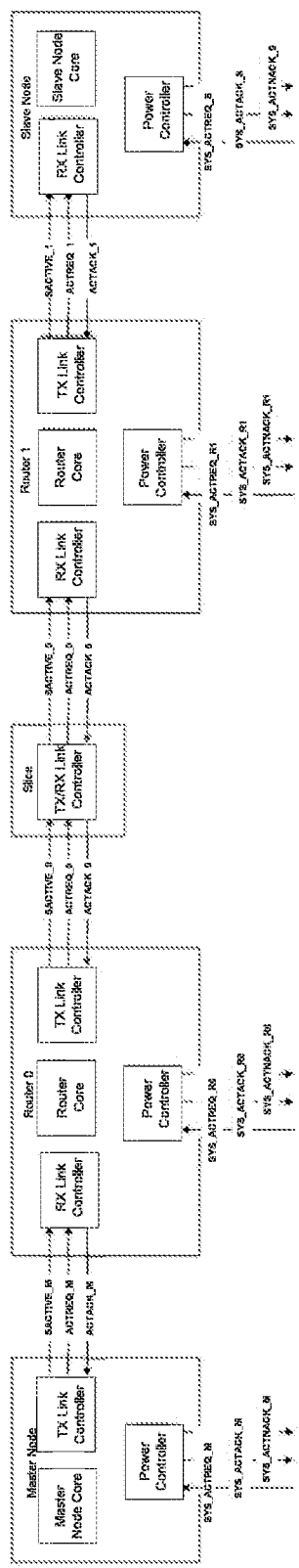
FIG. 6 is an example illustrating a partial view of a link segment of the primary NoC.

FIG. 6 is diagram illustrating a partial view of a link segment of the primary NoC (20) comprising master node, routers, non-flow-control slices and slave node. Examples 1 to 7 will describe low-level details of how the hardware components (22) respond to the system-level commands. It could be the system's (10) firmware via secondary the NoC (30) or system's (10) hardware via sideband signals which directly control system-level active request. Further, examples 8 to 10 will describe the hardware-firmware interaction flow to carry out clock gating of the components (22) identified to be powered off.

Example 1: Router Power Management

Figure 7:
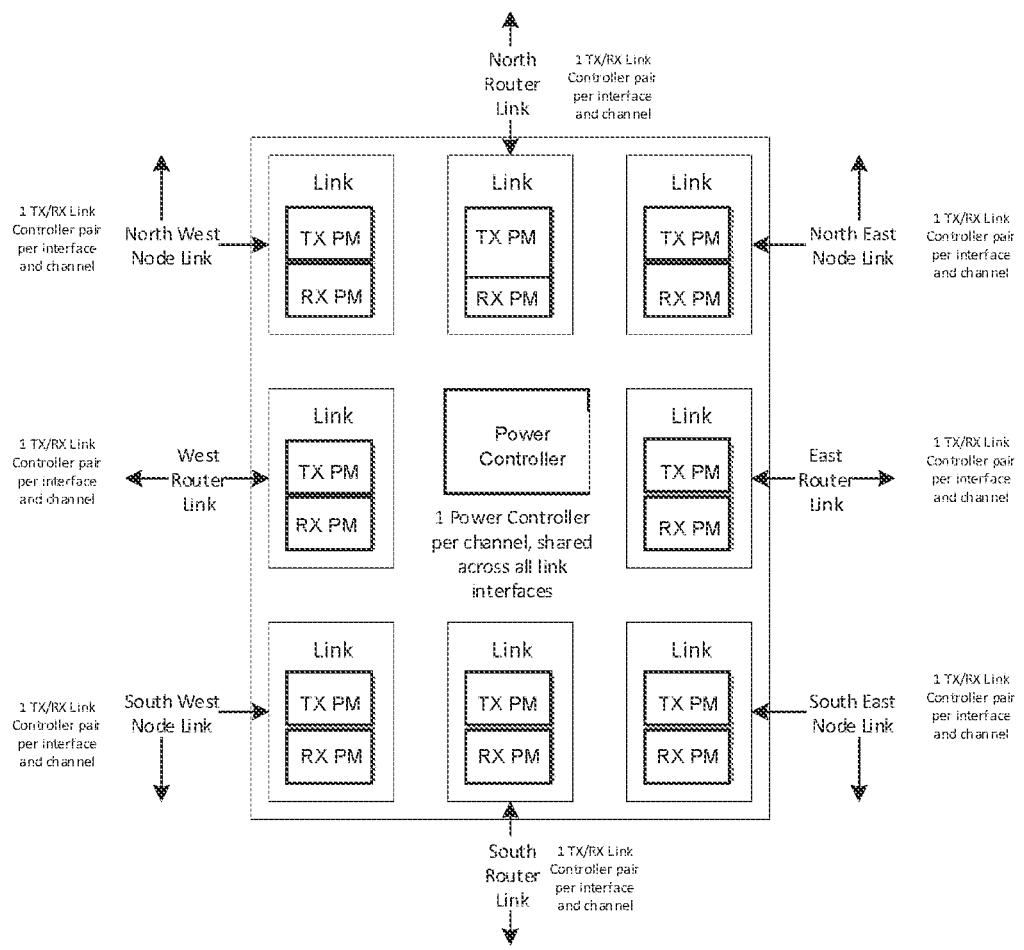
FIG. 7 is a diagram illustrating a power management block for a router.

FIG. 7 is a diagram illustrating router power management blocks. Both types of functional blocks, including the power controller and the TX/RX link controllers, remain always-on to quickly respond to power-off and power-on events. Each router's power in the primary NoC (20) is controlled by the following controllers:
  (i) the power controller (one per channel, shared across all link interfaces); and
  (ii) the TX/RX link controllers (one pair per interface and per channel).

Each router supports power management with the following signals:
  (i) SYS_ACTREQ is the SYStem-level ACTive REQuest. The system's hardware driven by a dedicated signal or the software via the secondary NoC (30) will assert it whenever it wants to enter a RUN state and de-assert it to enter a STOP state.
  (ii) SYS_ACTACK is the SYStem-level ACTive ACKnowledge. Whenever the router is in the RUN state, it will assert this to system's (10) hardware and/or software.
  (iii) SYS_ACTNACK is the SYStem-level ACTive Negative ACKnowledge. Whenever the router wants to abort the power-off request, it will assert this to the system's (10) hardware and/or software.
  (iv) SACTIVE is the pending activity signal which indicates transactions in progress. There is one of these per link. The transmitter asserts this signal whenever it has pending flow control units (flits).

Notably, all these signals must be positive polarity, which means asserted is active high (1) and de-asserted is idle or deactivate low (0) so that whenever power is physically removed or power is gated, they will signal inactive.

Router Power-on Flow

Figure 8:
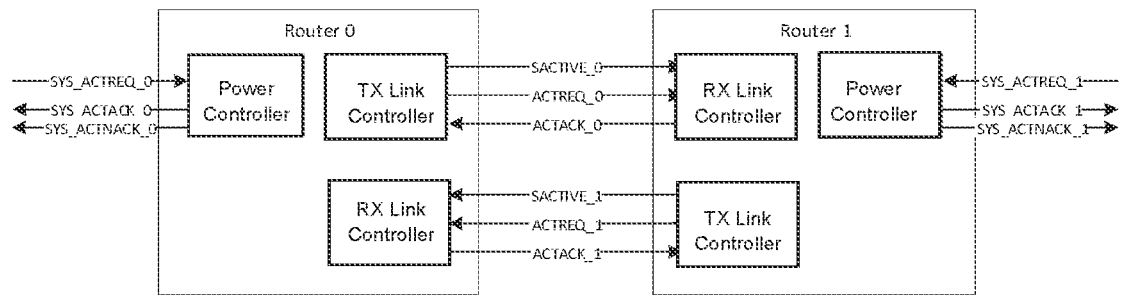
FIG. 8 is a diagram illustrating a power controller and a pair of transmitter and receiver link controllers for an adjacent pair of routers.
Figure 9:
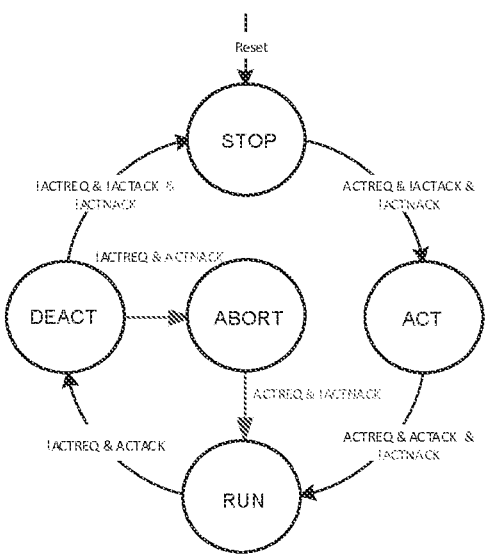
FIG. 9 is a diagram illustrating a power state finite-state machine.

FIG. 8 is a diagram illustrating the power controller and the TX/RX link controllers for an adjacent pair of routers. FIG. 9 is a diagram illustrating the power state finite-state machine (FSM). Upon coming out of reset, the power state FSM is in a STOP state. The following describes the flow to power on Router 0 by the power management unit (40) through the secondary NoC master node (34) and the secondary NoC node (32) associated to the Router 0:
  1. The power management unit (40) applies power to the Router 0 (physical power-on).
  2. The power management unit (40) waits for the Router 0's power to be stable.
  3. The power management unit (40) asserts SYS_ACTREQ_0 to request the Router 0 to power-on (logical power-on).
  4. The Router 0 un-gates it's clocks.
  5. The Router 0 de-asserts its reset.
  6. The Router 0 asserts ACTREQ_0 to Router 1.
  7. The Router 1 carry out the following steps:
    (a) If the Router 1 is ready to transition to the RUN state. The readiness criteria refer to SYS_ACTREQ being asserted but SYS_ACTACK is currently still de-asserted (but has started the process of transitioning to assert eventually). Assert ACTACK_0 and ACTREQ_1 to the Router 0.
    (b) If the Router 1 is in STOP state, the Router 1 will keep ACTACK_0 de-asserted and keep ACTREQ_1 de-asserted. Proceed to step (a) when the Router 1 is ready to transition to the RUN state.
  8. When the Router 0 sees the Router 1 asserts ACTREQ_1, the Router 0 will assert ACTACK_1 to the Router 1.
  9. When ACTACK_0, ACTACK_1 and the ACTACK_<all_other_link_interfaces_for_router_0> are asserted, then the Router 0 will assert SYS_ACTACK_0 to indicate to the power management unit (40) that the Router 0 is in the RUN state.

Figure 10:
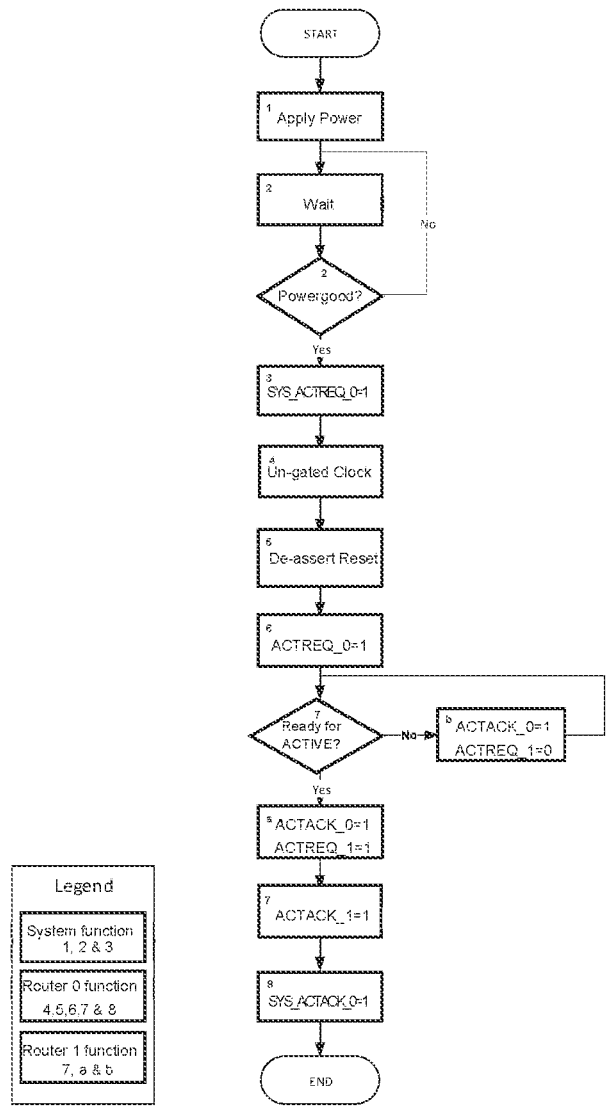
FIG. 10 is a flow diagram illustrating the Router power-on flow.

FIG. 10 is a flow diagram illustrating the router power-on flow.

Router Power-Off Flow

With reference to FIG. 8, the following describes the flow to power off the Router 0 by the power management unit (40) through the secondary NoC master node (34) and the secondary NoC node (32) associated to the Router 0:
  1. The power management unit (40) de-asserts SYS_ACTREQ_0 to request the Router 0 to power-off.
  2. (a) If there are no pending flits, the Router 0 de-asserts ACTREQ_0 to the Router 1 and returns all credits on its TX link. Proceed to Step 3.
    (b) If there are pending flits, then the Router 0 will tell the power management unit (40) to abort the power-off request. The Router 0 will assert SYS_ACTNACK_0 and wait until the power management unit (40) de-asserts SYS_ACTREQ_0 (backing-off). Then the Router 0 will de-assert SYS_ACTNACK_0. The flow ends here for the abort case.
  3. The adjacent Router 1 or node detects ACTREQ_0 de-asserting and reacts by:

(a) De-asserting ACTACK_0 to the Router 0, after receiving all credits.
(b) De-asserting ACTREQ_1 to the Router 0 and returns all its credits to the Router 0.
4. The Router 0 de-asserts ACTACK_1 upon receiving all link credits from the Router 1 and seeing the Router 1 de-assert ACTREQ_1.
5. When the Router 0 detects ACTACK_0 and ACTACK_1 for all its link interfaces have been de-asserted, it will de-assert SYS_ACTACK_0 to the power management unit (40) to indicate that the Router 0 is in STOP state. Now the clocks and power are ready to be gated, except the power controller and the TX/RX link controllers which are always powered-on to police wake (power-on) and sleep (power-off) events.

Figure 11:
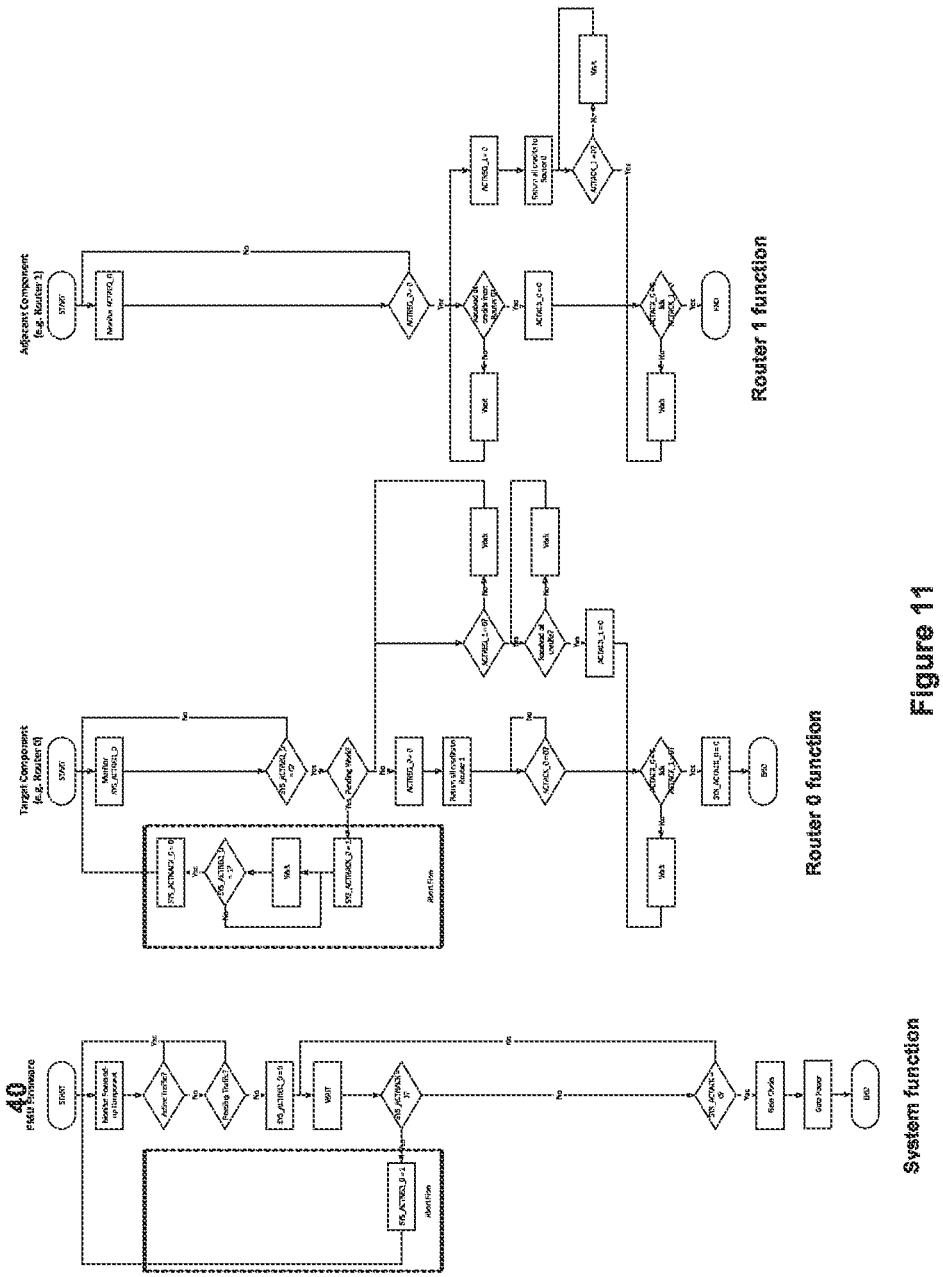
FIG. 11 is a flow diagram illustrating the Router power-off flow.

FIG. 11 is a flow diagram illustrating the router power-off flow.

Example 2: Master Node Power Management

Each master node's power in the primary NoC (20) is controlled by the following controllers:
(i) the power controller (one per channel, shared across all link interfaces); and
(ii) the TX/RX link controllers (one pair per interface and per channel).

Master Node Power-on Flow

Figure 12:
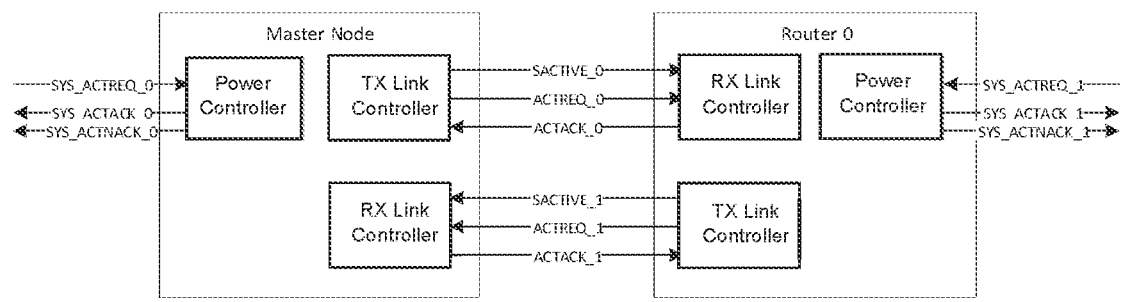
FIG. 12 is diagram illustrating a Master Node's link to a Router.

FIG. 12 is a diagram illustrating the Master Node's link to the Router 0. The following describes the flow to power on the Master Node by the power management unit (40) through the secondary NoC master node (34) and the secondary NoC (32) associated to the Master Node:
1. The power management unit (40) applies power to the Master Node (physical power-on).
2. The power management unit (40) waits for the Master Node's power to be stable.
3. The power management unit (40) asserts SYS_ACTREQ_0 to request Master Node to power-on (logical power-on).
4. The Master Node un-gates its clocks.
5. The Master Node de-asserts its reset.
6. The Master Node asserts ACTREQ_0 to the adjacent Router 0.
7. The Router 0 carry out the following steps:
    (a) If the Router 0 is already in a RUN state (i.e. the Router 0's SYS_ACTREQ_1 AND SYS_ACTACK_1 are both asserted or it is ready to transition to the RUN state, (i.e. SYS_ACTREQ_1 is asserted, but SYS_ACTACK_1 is still de-asserted but is in the process of transitioning to asserted eventually) it will assert ACTACK_0 to the Master Node.
    (b) If the Router 0 is NOT in the RUN state, it will:
        (i) keep ACTACK_0 de-asserted to the Master Node.
        (ii) keep ACTREQ_1 de-asserted to the Master Node.
        (iii) proceed to step (a) only when the Router 0 is ready to transition to the RUN state.
    (b) When the Master Node sees ACTREQ_1 assert, it will assert ACTACK_1 to adjacent Router 0.
    (c) When both ACTACK_0 and ACTACK_1 are asserted, the Master Node will assert SYS_ACTACK to the power management unit (40) to indicate that the Master Node is now in the RUN state, which means that the power-on flow has completed and that the Master Node can start accepting packets.

Master Node Power-Off Flow

If a Master Node has a coherent interface, the power management unit (40) must first disable the system coherency via the SYSCOREQ/SYSCOACK flow. This is required to prevent snoops from being issued by Home Node or Coherency Hub that might interrupt the power-off flow. With reference to FIG. 12, the following describes the flow to power off the Master Node by the power management unit (40) through the secondary NoC master node (34) and the secondary NoC node (32) associated to the Master Node:
1. The power management unit (40) de-asserts SYS_ACTREQ_0 to request Master Node to start the power-off process.
2. (a) If there are no pending requests, responses and flits, the Master Node de-asserts ACTREQ_0 to the Router 0 and returns all credits on the TX link. Proceed to step 3.
    (b) If there are pending requests, responses and flits, then the Master Node will tell the power management unit (40) to abort the power-off request. The Master Node will assert SYS_ACTNACK_0 and wait until the power management unit (40) de-asserts SYS_ACTREQ_0 (backing-off). Then the Master Node will de-assert SYS_ACTNACK_0. The flow ends here for the abort case.
3. The Router 0 detects ACTREQ_0 de-assert and then:
    (a) wait for all credits to be returned from the Master Node before de-asserting ACTACK_0 to the Master Node.
    (b) the Router 0 will also de-assert ACTREQ_1 and return all credits to the Master Node.
4. The Master Node detects ACTREQ_1 de-assert and then waits for the Router 0 to return all its credits before de-asserting ACTACK_1 to the Router 0.
5. When the Master Node detects that ACTACK_0 and ACTACK_1 are both de-asserted, it will de-assert (clear) SYS_ACTACK to the power management unit (40). This indicates that the logical power-off flow has completed and that the Master Node is in the STOP state. Now the Master Node's clocks and power are ready to be gated, except for the power controller and the TX/RX link controllers which are always-on to police wake and sleep events.

Example 3: Slave Node Power Management

Each slave node's power in the primary NoC (20) is controlled by the following controllers:
(i) the power controller (one per channel, shared across all link interfaces); and
(ii) the TX/RX link controllers (one pair per interface and per channel).

Slave Node Power-on Flow

Figure 13:
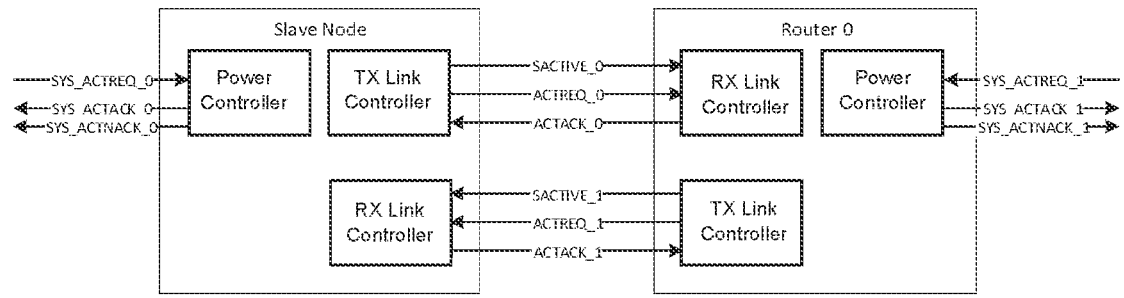
FIG. 13 is a diagram illustrating a Slave Node's link to a Router.

FIG. 13 is a diagram illustrating the Slave Node's link to the Router 0. The following describes the flow to power on the Slave Node by the power management unit (40) through the secondary NoC master node (34) and the secondary NoC node (32) associated to the Slave Node:
1. The power management unit (40) applies power to the Slave Node (physical power-on).
2. The power management unit (40) waits for the Slave Node's power to be stable.
3. The power management unit (40) asserts SYS_ACTREQ_0 to request the Slave Node to power-on (logical power-on).
4. The Slave Node un-gates its clocks.
5. The Slave Node de-asserts its reset.

6. The Slave Node asserts ACTREQ_0 to the adjacent Router 0.
7. The Router 0 carry out the following steps:
   (a) If the Router 0 is already in the RUN state (i.e. the Router 0's SYS_ACTREQ_1 AND SYS_AC-TACK_1 are both asserted) or is ready to transition to the RUN state, (i.e. SYS_ACTREQ_1 is asserted but SYS_ACTACK_1 is still de-asserted but is in the process of transitioning to asserted eventually) it will assert ACTACK_0 to the Slave Node.
   (b) If is NOT in RUN state, it will:
      (i) keep ACTACK_0 de-asserted to the Slave Node.
      (ii) keep ACTREQ_1 de-asserted to the Slave Node.
      (iii) proceed to step (a) only when the Router 0 is ready to transition to the RUN state.
8. When the Slave Node sees ACTREQ_1 assert, it will assert ACTACK_1 to Router 0.
9. When both ACTACK_0 and ACTACK_1 are asserted, the Slave Node will assert SYS_ACTACK to the power management unit (40) to indicate that the Slave Node is now in the RUN state that the power-on flow has completed and that the Slave Node can start accepting packets.

Slave Node Power-Off Flow

Before the power management unit (40) begins the process of powering off the Slave Node, it must first ensure that all the Master Nodes which can access the current Slave Node must be in the STOP state. This prerequisite move is necessary to prevent new transactions from being sent to the current Slave Node when it has been powered off. With reference to FIG. 13, the following describes the flow to power off the Slave Node by the power management unit (40) through the secondary NoC master node (34) and the secondary NoC node (32) associated to the Slave Node:
1. The power management unit (40) de-asserts SYS_ACTREQ_0 to request the Slave Node to start the power-off process.
2. If there are no pending requests, responses and FLITs, then the Slave Node de-asserts ACTREQ_0 to the Router 0 and returns all credits on the TX link.
3. The Router 0 detects ACTREQ_0 de-assert and then:
   (a) waits for all credits to be returned from the Slave Node before de-asserting ACTACK_0 to the Slave Node.
   (b) the Router 0 will also de-assert ACTREQ_1 & return all credits to the Slave Node.
4. The Slave Node detects ACTREQ_1 de-assert and then waits for the Router 0 to return all its credits before de-asserting ACTACK_1 to the Router 0.
5. When the Slave Node detects that ACTACK_0 and ACTACK_1 are both de-asserted, it will de-assert (clear) SYS_ACTACK to the power management unit (40). This indicates that the logical power-off flow has completed and that the Slave Node is in the STOP state. Now the Slave Node's clocks and power are ready to be gated, except for the power controller and TX/RX link controllers which are always-on to police sleep and wake events.

Example 4: Slice Power Management

The slice is the component (22) which serves as a repeater on very long links in the primary NoC (20). There are two flavours of slice which are non-flow-control slices and the flow-control slices. The non-flow-control slices do not need any dedicated power management blocks since it will share a same power domain with the component (22) on one of its two adjacent links. The non-flow-control slices can be powered on either before or at the same time as either adjacent device. Although it can potentially be powered on later, doing so would result in a pointless increase in logical power-on latency. Meanwhile, the flow-control slices look exactly like the router from the power management perspective. Hence, the power-on and -off flows are exactly like the router power-on and -off flows described in example 1.

Example 5: Home Node Power Management

The home node or coherent hub is the component (22) that manages coherency within coherent NoCs. They are responsible for performing snoops and other cache maintenance operations. Each home node's power is controlled by the following controllers:
   (i) the power controller controls the power state of the home node;
   (ii) a request node (RN) link controller controls the power state of the master node or a RN link interface; and
   (iii) a Subordinate Node (SN) link controller controls the power state of the slave node or SN link interface.

Home Node Power-on Flow

Figure 14:
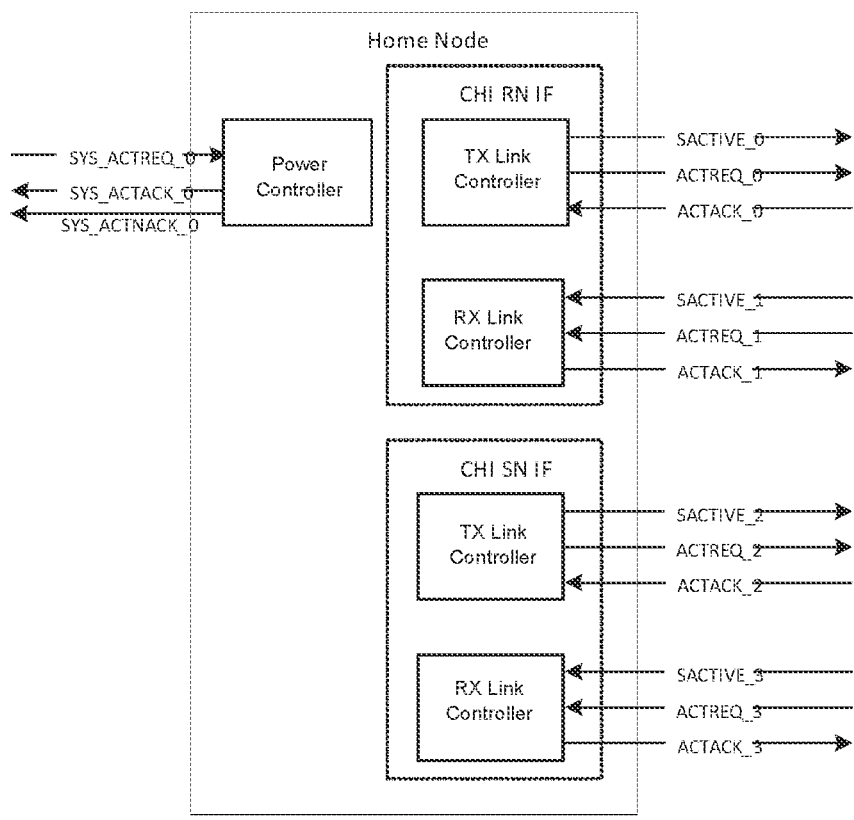
FIG. 14 is a diagram illustrating a power management block for a Home Node.

FIG. 14 is a diagram illustrating a power management block for the Home Node. The following describes the flow to power on the Home Node by the power management unit (40) through the secondary NoC master node (34) and the secondary NoC node (32) associated to the Home Node:
1. The power management unit (40) applies power to the Home Node (physical power-on).
2. The power management unit (40) waits for the Home Node's power to be stable.
3. The power management unit (40) asserts SYS_ACTREQ_0 to request the Home Node to power-on (logical power-on).
4. The Home Node un-gates its clocks.
5. The Home Node de-asserts its reset.
6. The Home Node asserts ACTREQ_0 and ACTREQ_2 to its adjacent link interfaces where the Home Node links function like the RN and SN respectively.
7. On the adjacent link interface where the Home Node manages the link like the RN:
   (a) If adjacent link interface is ready to transition to the RUN state. The readiness criteria refers to the adjacent component's (22) SYS_ACTREQ being asserted but SYS_ACTACK is currently still de-asserted (but has started the process of transitioning to asserted eventually). Adjacent device asserts ACTACK_0 and ACTREQ_1 to the Home Node.
   (b) If adjacent link is NOT in the RUN state and not yet ready to go into the RUN state, it will:
      (i) keep ACTACK_0 de-asserted to Home Node.
      (ii) keep ACTREQ_1 de-asserted to Home Node.
      (iii) Proceed to step (a) if the adjacent link interface is ready to transition to the RUN state.
8. On the adjacent link interface where the Home Node manages the link like an SN:
   (a) If the adjacent link interface is ready to transition to RUN state. The readiness criteria refers to the adjacent component's (22) SYS_ACTREQ being asserted but SYS_ACTACK is currently still de-asserted (but has started the process of transitioning to asserted eventually). Adjacent device asserts ACTACK_2 and ACTREQ_3 to the Home Node.
   (b) If the adjacent link is NOT in the RUN state and not yet ready to go into the RUN state, it will:

(i) keep ACTACK_2 de-asserted to the Home Node; and
(ii) keep ACTREQ_3 de-asserted to the Home Node.
(iii) Proceed to step (a) if the adjacent link interface is ready to transition to RUN state.
9. When ACTACK_0, ACTACK_1, ACTACK_2 and ACTACK_3 signals are asserted, assert SYS_ACTACK to the power management unit (40) to indicate that the Home Node is now in the RUN state that the power-on flow has completed and that the Home Node can start accepting packets.

Home Node Power-Off Flow

Prior to powering-down the Home Node, the power management unit (40) must ensure that all the Master Nodes that can send transactions to the current Home Node must be in STOP state, indicating that there are no pending requests and no pending responses in the Home Node. With reference to FIG. 14, the following describes the flow to power off the Home Node by the power management unit (40) through the secondary NoC master node (34) and the secondary NoC node (32) associated to the Home Node:

1. The power management unit (40) de-asserts SYS_ACTREQ_0 to request the Master Node to start the power-off process.
2. If there are no pending requests, responses and flits, the Home Node de-asserts ACTREQ_0 and ACTREQ_2 and returns all credits on its TX link.
3. The adjacent link interface detects ACTREQ_0 de-assert and then:
   (a) waits for all credits to be returned from the Home Node before de-asserting ACTACK_0 to the Home Node.
   (b) it will also de-assert ACTREQ_1 and return all credits to the Home Node.
4. The adjacent link interface detects REQACT_2 de-assert and then:
   (a) waits for all credits to be returned from Home Node before de-asserting ACTACK_2 to the Home Node.
   (b) it will also de-assert ACTREQ_3 and return all credits to the Home Node.
5. When ACTACK_0, ACTACK_1, ACTACK_2 and ACTACK_3 are all de-asserted, the Home Node will de-assert (clear) SYS_ACTACK to the power management unit (40). This indicates that the logical power-off flow has completed and that the Home Node is in the STOP state. Now the Home Node's clocks and power are ready to be gated except for the power controller and link controllers which are always-on to police wake and sleep events.

Example 6: Power-Off Abort Mechanism

Figure 15:
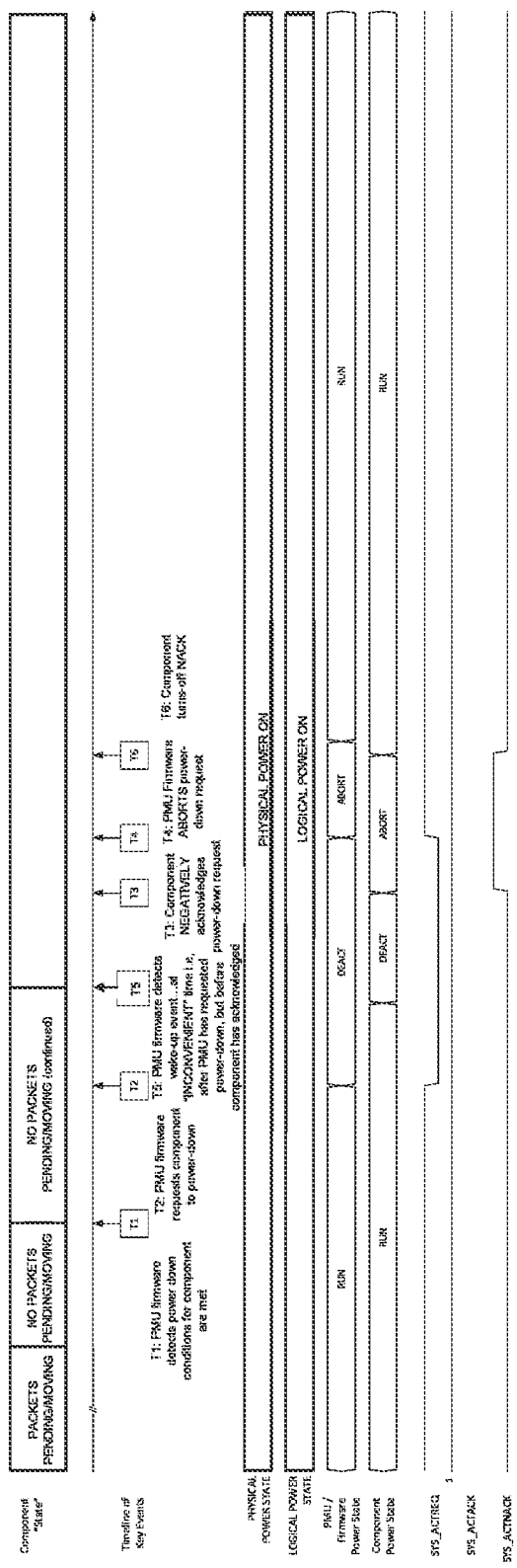
FIG. 15 is a diagram illustrating a power-off abort scenario.

FIG. 15 is a diagram illustrating power-off abort scenario with negative acknowledgement (NACK) option where the power management unit (40) can abort the power-off request in a just-in-time manner. Consider the following boundary condition, at time T1, the power management unit (40) detects that component A is idle. Therefore, the power management unit (40) de-asserts ACTIVEREQ at T2 to request the component A to power off. The component A de-asserts ACTIVEACK at T3 to acknowledge that it can be powered off. Assuming that in the window of time between T2 and T3, a packet of traffic suddenly appears from out of the blue. Ideally, the system should now change its mind and abort the power-off request. However, the component A is unable to back off from the power-off request because it lacks a mechanism to tell the requestor to back-off. Having the ability to back off is vital for the system's (10) efficiency, because forcing a power-off to immediately re-power-on is a slow process taking potentially hundreds of micro-seconds. The present invention introduces the ACTIVENACK option to provide a flexible alternative which allows the system (10) to gracefully back off just-in-time without getting dragged into an unnecessary power-off and re-power-on sequence.

Example 7: Self-Managing Power of the Secondary NoC (30)

In a 1:1 mapping of primary NoC component (22) to the secondary NoC node (32), the physical powering-off of any component (22) of the primary NoC (20) will trigger its corresponding second NoC node (32) to logically and physically power off. When the secondary NoC node (32) is logically powered off, the changes to its link status will be detected by its neighbouring or adjacent nodes. These neighbouring or adjacent nodes will now logically power off too and this in turn triggers their own neighbouring or adjacent nodes to also logically power off. This starts a chain reaction which ripples through the entire secondary NoC (30). Eventually, the entire secondary NoC (30) will be in the logical power-off state. Once the entire secondary NoC (30) has been torn down, the secondary NoC master node (34) will initiate the re-discovery and enumeration process. When the re-discovery process is completed, the secondary NoC node (32) which initiated the chain reaction will be logically cut-off from the secondary NoC (30), and the packets which were originally routed through it will now bypass it. When the other secondary NoC nodes (32) that are not involved in initiating the chain reaction are logically powered off, they can also be optionally physically powered off. However, this is not recommended because this tear-down is temporary. Hence, it makes sense for them to remain physically powered-on to facilitate faster re-discovery. This concept can be extended to N:1 mappings. The only difference is that all N components (22) of the primary NoC (20) need to be powered off as a pre-requisite to power off their single corresponding secondary NoC node (32).

Example 8: Single Domain Power-on and Power-Off

Figure 16:
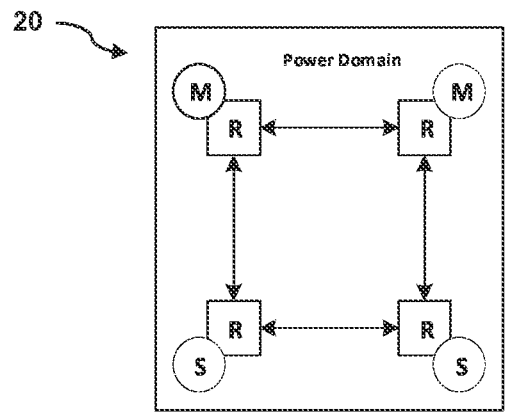
FIG. 16 is an example illustrating a power gating for a single power domain.

FIG. 16 is a diagram illustrating a power gating example for a single power domain, which means the whole primary NoC (20) is grouped under the single power domain.

Power Gate Flow for Single Power Domain

The following describe the power gate flow for the single domain NoC:

1. Trigger power gate sequence for all master nodes (M).
   (a) This prevents new request from being accepted but allows pending requests or responses to complete.
   (b) Upon finishing all pending transactions, enter the STOP state and clock gate.
2. Trigger the power gate for all the routers (R) and the slave nodes(S).
   (a) There should be no pending flits, requests, responses in the router or the slave node. Therefore, the router and the slave node can enter the STOP state and clock gate.
3. Ready to the power gate.

Power Ungate Flow for Single Power Domain

The following describe the power ungate flow for the single domain NoC:

1. Ungate power and ensure power is stable.
2. Trigger power ungate sequence for all the master nodes, the slave nodes and the routers.
   (a) Sequence of trigger does not matter in power ungate flow.

Example 9: Dual Domain Power-on and Power-Off

Figure 17:
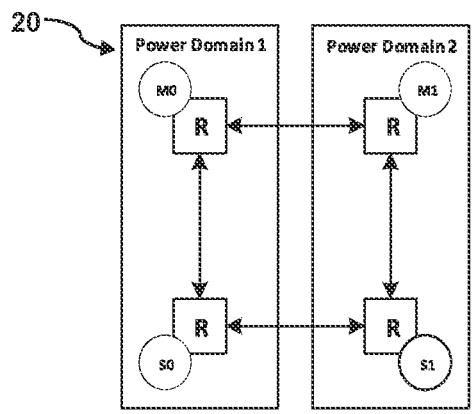
FIG. 17 is an example illustrating a power gating for a dual power domain NoC in accordance with a first embodiment of the present invention.

FIG. 17 is a diagram illustrating a power gating example for a dual power domain NoC, which means the primary NoC (20) is split into two power domains comprised of power domain 1 and power domain 2. Each power domain comprises the master node, routers and the slave node.

Power Gate Flow for Power Domain 1
The following describe the power gate flow for the power domain 1:
1. Trigger power gate sequence for the master node M0.
   (a) This prevents new request from being accepted but allows pending requests/responses to complete.
   (b) Upon finishing all pending transactions, enter the STOP state and clock gate.
2. Trigger power gate for the routers and the slave nodes in the power domain 1.
   (a) There should be no pending flits, requests, responses in the router or slave node thus the router and the slave node can enter STOP state and clock gate.
   (b) Assuming there are no requests or pending responses from M1 to the slave node S0, this must be guaranteed by the power management unit (40).
3. Ready to the power gate.
   (a) After the power gate, if there are pending flits from the routers in the power domain 2 to the power domain 1, it shall trigger an interrupt to power management unit (40) that the adjacent router is trying to send flits into current power gated domain.

Power Ungate Flow for Power Domain 1
The following describe the power ungate flow for the power domain 1:
1. Ungate power and ensure power is stable.
2. Trigger power ungate sequence for all the master nodes, the slave nodes and the routers within the power domain 1.
   (a) Sequence of trigger does not matter in power ungate flow.

Example 10: Another Dual Domain Power-on and Power-Off

Figure 18:
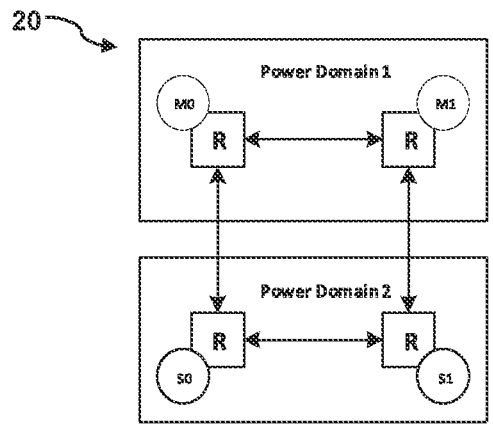
FIG. 18 is an example illustrating a power gating for a dual power domain NoC in accordance with a second embodiment of the present invention.

FIG. 18 is a diagram illustrating a power gating example for another dual power domain NoC comprised of power domain 1 and power domain 2. The power domain 1 comprises the master nodes and the routers, whereas the power domain 2 comprises the slave nodes and the routers.

Power Gate Flow for Power Domain 1
The following describe the power gate flow for the power domain 1:
1. Trigger power gate sequence for the master node M0 and M1.
   (a) This prevents new request from being accepted but allows pending requests and responses to complete.
   (b) Upon finishing all pending transactions, enter the STOP state and clock gate.
2. Trigger the power gate for the routers in the power domain 1.
   (a) There should be no pending flits, requests and responses in the router. Therefore, the router can enter the STOP state and clock gate.
   (b) Assuming there are no pending responses from the slave node S0 or S1, this is guaranteed because all the master requests within the NoC are gated.
3. Ready to the power gate.

Power Ungate Flow for Power Domain 1
The following describe the power ungate flow for the power domain 1:
1. Ungate power and ensure power is stable.
2. Trigger power ungate sequence for all master nodes and routers within power domain 1. Sequence of trigger does not matter in power ungate flow.

Power Gate Flow for Power Domain 2
The following describe the power gate flow for the power domain 2:
1. Trigger power gate sequence for the slave nodes S0 and S1 in power domain 2.
   (a) Upon finishing all pending transactions, enter the STOP state and clock gate.
   (b) Assuming the power management unit (40) has to guarantee that M0 and M1 do not issue new requests.
2. Trigger the power gate for the routers in the power domain 2.
   (a) There should be no pending flits, requests and responses in the router. Therefore, the router can enter the STOP state and clock gate.
   (b) Assuming there are no pending responses from S0 or S1, this is guaranteed because all the master requests within the NoC are gated.
3. Ready to the power gate.

Power Ungate Flow for the Power Domain 2
1. Ungate power and ensure power is stable.
2. Trigger power ungate sequence for all slave nodes and routers within the power domain 2. Sequence of trigger does not matter in power ungate flow.

The system (10) and method of the present invention overcome the problems and shortcomings of the existing solutions. For example, in addition to power-manage the NoC at the link level, the present invention also provides power management at the component (22) level, which means each component of the primary NoC (20) will be managed and controlled to optimize the power consumption. Moreover, the secondary NoC (30) is capable of power-managing itself while managing the power of the primary NoC (20). This is important because it eliminates the need to create a tertiary NoC to power-manage the secondary NoC. Furthermore, the power-off abort mechanism allows the system (10) to back-off from un-necessary power cycles thereby preventing any degradation in performance.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the invention is anticipated to hold on to all other such alternatives, modifications, and variations that fall within the scope of the present invention and appended claim.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A system for network-on-chip power management, comprising:
   a primary network-on-chip comprises multiple components, each component having a power controller; characterized by
   a secondary network-on-chip comprises a secondary network-on-chip master node and a plurality of secondary network-on-chip nodes connected thereto, the plurality of secondary network-on-chip nodes associated to the components of the primary network-on-chip for power managing individual and link components of the primary network-on-chip; and
   a power management unit connected to the secondary network-on-chip master node, configured to polling status registers of the components of the primary network-on-chip for accessing power states of each component, accessing routing information of the components of the primary network-on-chip and sending request to the secondary network-on-chip nodes for powering on or off the associated components of the primary network-chip through the power controller.

2. The system as claimed in claim 1, wherein each component of the primary network-on-chip further comprises a transmitter link controller and a receiver link controller interoperating with the power controller.

3. The system as claimed in claim 1, wherein the components of the primary network-on-chip comprise routers, node interfaces, slices, and coherent hubs.

4. The system as claimed in claim 1, wherein each of the secondary network-on-chip nodes is connected to at least one component of the primary network-on-chip.

5. The system as claimed in claim 1, wherein the primary network-on-chip is a static routing comprises routing table.

6. The system as claimed in claim 1, wherein the primary network-on-chip comprises a single, dual or multiple power domains.

7. A computer-implemented method for network-on-chip power management, comprising:
   receiving powering-off request from a power controller within a component of a primary network-on-chip by a secondary network-on-chip;
   executing an interrupt service check to check the interrupt source's status registers to identify the interrupted component and effect of interrupting to link components;
   accessing routing information of the primary network-on-chip for traffic condition to identify the components of the primary network-on-chip to be powered off; and
   powering off the components of the primary network-on-chip by the secondary network-on-chip based on the interrupted component, effect of interrupting to link components and routing information;
   wherein the steps of executing the interrupt service check and accessing routing information of the primary network-on-chip are conducted by a power management unit connected to the secondary network-on-chip.

8. The method as claimed in claim 7, wherein the method further comprises polling status registers of the components of the primary network-on-chip for detecting low power states component of the primary network-on-chip by the power management unit prior to executing an interrupt service check when there is no powering-off request.

9. The method as claimed in claim 7, wherein the method further comprises:
   receiving a power-on request from the component of the primary network-on-chip by the power management unit through the secondary network-on-chip;
   powering on the respective component of the primary network-on-chip; and
   powering on the link components of the primary network-on-chip;
   wherein the link components are the components that involves as a pathway in conveying a packet from source to destination.

10. The method as claimed in claim 9, wherein the power management unit updates the routing information upon powering on the components of the primary network on-chip.

11. The method as claimed in claim 7, wherein the method further comprises aborting a powering-off request upon detecting a change of traffic condition by the power management unit.

* * * * *